United States Patent
Laas et al.

(10) Patent No.: US 9,926,402 B2
(45) Date of Patent: Mar. 27, 2018

(54) IMINOOXADIAZINEDIONE POLYISOCYANATES

(71) Applicant: Bayer MaterialScience AG, Monheim Am Rhein (DE)

(72) Inventors: Hans-Josef Laas, Odenthal (DE); Dieter Mager, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/562,813

(22) Filed: Dec. 8, 2014

(65) Prior Publication Data
US 2015/0158966 A1   Jun. 11, 2015

(30) Foreign Application Priority Data
Dec. 10, 2013 (EP) .................................. 13196508

(51) Int. Cl.
*C08G 18/22* (2006.01)
*C08G 18/10* (2006.01)
*C08G 18/00* (2006.01)
*C08G 18/79* (2006.01)
*C08G 18/09* (2006.01)
*C08G 18/73* (2006.01)
*C08G 18/02* (2006.01)

(52) U.S. Cl.
CPC ............. *C08G 18/10* (2013.01); *C08G 18/00* (2013.01); *C08G 18/022* (2013.01); *C08G 18/092* (2013.01); *C08G 18/222* (2013.01); *C08G 18/73* (2013.01); *C08G 18/791* (2013.01)

(58) Field of Classification Search
CPC .. C08G 18/092; C08G 18/222; C08G 18/791; C08G 18/73
See application file for complete search history.

(56) References Cited

U.S. PATENT DOCUMENTS

| 3,426,025 A | 2/1969 | Smeltz | |
|---|---|---|---|
| 5,126,170 A | 6/1992 | Zwiener et al. | |
| 5,252,696 A | 10/1993 | Laas et al. | |
| 5,846,897 A * | 12/1998 | Blank | B01J 31/2234 252/182.2 |
| 5,914,383 A * | 6/1999 | Richter | C07D 251/32 528/59 |
| 6,107,484 A | 8/2000 | Richter et al. | |
| 6,426,414 B1 | 7/2002 | Laas et al. | |
| 2002/0151671 A1* | 10/2002 | Richter | C08G 18/09 528/45 |
| 2004/0014881 A1* | 1/2004 | Baumgart | C08G 18/6254 524/589 |
| 2004/0014927 A1* | 1/2004 | Watanabe | C08G 18/7837 528/44 |
| 2004/0034162 A1 | 2/2004 | Laas et al. | |
| 2010/0311937 A1* | 12/2010 | Tulloch | C08G 18/092 528/56 |

FOREIGN PATENT DOCUMENTS

| CA | 2244486 A1 | 2/1999 | |
|---|---|---|---|
| EP | 0169707 A2 | 1/1986 | |
| EP | 0403921 B1 | 11/1994 | |
| EP | 0540985 B1 | 1/1996 | |
| EP | 0798299 A1 | 10/1997 | |
| EP | 0896009 A1 | 2/1999 | |
| EP | 962455 A1 | 12/1999 | |
| EP | 0959087 B1 | 10/2003 | |
| EP | 1287052 B1 | 8/2004 | |
| JP | 59022916 * | 2/1984 | ............. C08G 18/22 |
| JP | S61151179 A | 7/1986 | |
| WO | WO-2009063245 A2 | 5/2009 | |

OTHER PUBLICATIONS

"Oligotrimerization of Hexamethylene Diisocyanate by Organometallic Catalysts." Dabi et al. European Polymer Journal, vol. 16, pp. 831-833.*
European Search Report for EP 13196508.9 dated Jan. 28, 2014.

* cited by examiner

*Primary Examiner* — Michael L Leonard
(74) *Attorney, Agent, or Firm* — Drinker Biddle & Reath LLP

(57) ABSTRACT

The present invention relates to a process for producing polyisocyanates comprising reacting an isocyanate component in the presence of a mono- or multinuclear complex of titanium, zirconium and/or hafnium as catalyst to give polyisocyanates having a content of iminooxadiazinedione groups of ≥20 mol % based on the total amount of isocyanurate and iminooxadiazinedione groups. The present invention also provides polyisocyanates obtainable by the process according to the invention and both polyurethanes and polyureas obtainable by reacting the polyisocyanates with at least one hydroxy-functional or amino-functional component respectively.

15 Claims, No Drawings

IMINOOXADIAZINEDIONE POLYISOCYANATES

FIELD OF THE INVENTION

The invention relates to a process for producing polyisocyanates. The invention further relates to polyisocyanates obtainable by the process and polyurethanes and polyureas obtainable from the polyisocyanates.

BACKGROUND OF THE INVENTION

A process for producing polyisocyanates having a high content of allophanate and isocyanurate groups is disclosed in JP-A 61-151179. The reaction catalyst employed is, for example, zirconium butoxide.

JP-A 61-151179 does not describe polyisocyanates having a high content of iminooxadiazinedione groups in the polyisocyanates. However, such polyisocyanates are advantageous since they exhibit very low viscosities coupled with high isocyanate functionality and are suitable for use in coating systems for example.

The synthesis of asymmetric trimers of HDI by catalytic oligomerisation is well known and can be carried out by use of hydrogen(poly)fluorides (EP-A 0789 299), especially of tetraalkyl ammonium- or tetraalkyl phosphonium-hydrogen-polyfluorides (EP-A 0896 009 and EP-A 0 962 455), as catalysts.

These catalysts are not commercially available and difficult to prepare. Their synthesis requires the use of the poisonous and very corrosive hydrofluoric acid and is merely possible by use of special reactors and under strong protection.

Moreover, in solvent-free form these catalysts are solids and have to be solved in a suitable solvent bevor they can be used in trimerisation reactions of isocyanates. Usually low-molecular mono alcoholes are used as solvent. The dosage of low amounts of highly concentrated solutions of catalysts in technical scale always is difficult. But in case polyfluorides are used as catalysts the amount of the used solvent must be as low as possible, as the selectivity with regard to the formation of asymmetric trimers is reduced very much in the presence of hydroxyl groups, so that the tendency to form iminooxadiazindion groups decreases significantly.

BRIEF SUMMARY OF THE INVENTION

It was an object of the present invention to provide a process for producing polyisocyanates having a high content of iminooxadiazinedione groups.

This object is achieved in the process according to the invention by reacting an isocyanate component in the presence of a mono- or multinuclear complex of titanium, zirconium and/or hafnium as catalyst to give polyisocyanates having a content of iminooxadiazinedione groups of ≥20 mol % based on the total amount of isocyanurate and iminooxadiazinedione groups.

DETAILED DESCRIPTION OF THE INVENTION

According to a first preferred embodiment of the invention the complex can comprise at least one central atom M selected from titanium, zirconium and hafnium, wherein one or more ligands are coordinated to the central atom M via elements of group 15 and/or 16 of the periodic table, preferably via nitrogen, oxygen and/or sulphur and more preferably via oxygen. One advantage of these complexes is that they are simple to produce.

Here, it is particularly preferable when at least one alkoxide of general formula (I)

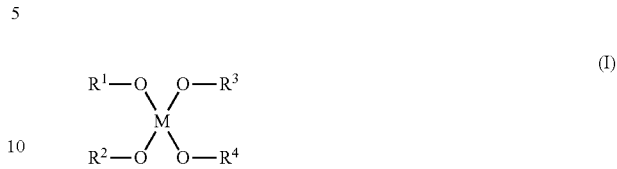

is employed as catalyst, where
M is titanium, zirconium or hafnium,
$R^1$, $R^2$, $R^3$ and $R^4$ are identical or different radicals and are each a saturated or unsaturated, linear or branched, optionally substituted aliphatic, cycloaliphatic, aromatic or araliphatic, preferably aliphatic or cycloaliphatic, radical which can comprise 1 to 18 carbon atoms, preferably 1 to 8 carbon atoms, and optionally up to 3 heteroatoms selected from oxygen, sulphur, nitrogen, preferably up to 3 oxygen atoms, and where $R^1$, $R^2$, $R^3$ and $R^4$ can also form, in any combination with one another together with M and at least two oxygen atoms and optionally further nitrogen or oxygen atoms, heterocyclic rings having 3 to 6 carbon atoms.

Examples of alkoxides useful as catalyst include: titanium tetramethylate, titanium tetraethylate, titanium tetra-n-propylate, titanium tetraisopropylate, titanium tetra-n-butylate, titanium tetraisobutylate, titanium tetra-sec-butylate, titanium tetra-tert-butylate, titanium tetra-2-ethylhexylate, titanium tetraoctylate, titanium tetracyclohexylate, titanium tetrastearylate, titanium tetra(methoxyethylate), titanium tetra(ethoxyethylate), titanium tetrabenzylate, titanium tetraphenolate, zirconium tetramethylate, zirconium tetraethylate, zirconium tetra-n-propylate, zirconium tetraisopropylate, zirconium tetra-n-butylate, zirconium tetra-tert-butylate, zirconium tetra-2-methyl-2-butylate, zirconium tetra-2-ethylhexylate, zirconium tetra-2-methoxymethyl-2-propylate, zirconium tetraphenolate, hafnium tetramethylate, hafnium tetraethylate, hafnium tetra-n-propylate, hafnium tetraisopropylate, hafnium tetra-n-butylate, hafnium tetra-tert-butylate, hafnium tetra-2-methyl-2-methoxypropylate, hafnium tetra-2,2-diethylpropylate, hafnium tetra-2-ethylhexylate and/or hafnium tetraoctylate. Preferentially useful are titanium tetra-n-butylate, zirconium tetraethylate, zirconium tetra-n-butylate, zirconium tetra-2-ethylhexylate, hafnium tetraethylate, hafnium tetra-n-butylate and/or hafnium tetra-2-ethylhexylate.

According to a further preferred embodiment, at least one carboxylate of general formulae (II) or (III)

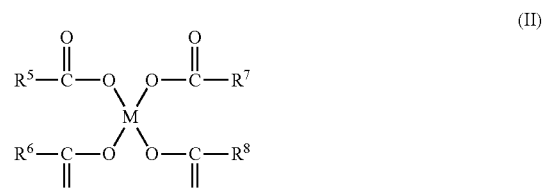

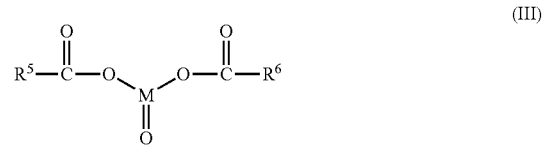

is employed as catalyst, where

M is titanium, zirconium or hafnium, $R^5$, $R^6$, $R^7$ and $R^8$ are identical or different radicals and are each a saturated or unsaturated, linear or branched aliphatic or cycloaliphatic, optionally substituted aromatic or araliphatic radical which can comprise 1 to 18 carbon atoms and optionally up to 3 heteroatoms selected from oxygen, sulphur, nitrogen, preferably are identical or different radicals and are each a saturated or unsaturated, linear or branched aliphatic or cycloaliphatic radical which can comprise 1 to 18 carbon atoms and optionally up to 3 heteroatoms selected from oxygen, sulphur, nitrogen, and more preferably are identical radicals and are each a saturated or unsaturated, linear or branched aliphatic or cycloaliphatic radical which can comprise 1 to 8 carbon atoms and optionally up to 3 oxygen atoms and where $R^5$, $R^6$, $R^7$ and $R^6$ in formula (II) and $R^5$ and $R^6$ in formula (III) can also form, in any combination with one another together with M and at least two oxygen atoms and optionally further nitrogen or oxygen atoms, heterocyclic rings having 3 to 6 carbon atoms, and can preferably form, together with M and two oxygen atoms, heterocyclic rings having 2 or 3 carbon atoms.

Particularly preferred carboxylates of general formula (II) are: titanium tetra-2-ethylhexanoate, titanium tetrastearate, titanium tetraacrylate, titanium tetrabenzoate, zirconium tetraacetate, zirconium tetrapropionate, zirconium tetrabutanoate, zirconium tetraoctanoate, zirconium tetra-2-ethylhexanoate, zirconium tetraneodecanoate, zirconium tetrastearate, zirconium oxalate, zirconium glycolate, zirconium lactate, zirconium tetraacrylate, zirconium tetramethacrylate, zirconium tetranaphthenate, hafnium tetraacetate, hafnium oxalate, hafnium tetraoctoate, hafnium tetra-2-ethylhexanoate and/or hafnium tetraneodecanoate.

Particularly preferred carboxylates of general formula (III) are: titanyl acetate, titanyl propionate, titanyl butanoate, titanyl pentanoate, titanyl hexanoate, titanyl 2-ethylhexanoate, titanyl octanoate, zirconyl acetate, zirconyl octanoate, zirconyl decanoate, zirconyl dodecanoate, zirconyl tetradecanoate, zirconyl pentadecanoate, zirconyl stearate, zirconyl dimethacrylate, zirconyl cyclopentanecarboxylate, zirconyl cyclohexanecarboxylate, zirconyl linolate, zirconyl linolenate, zirconyl oleate, zirconyl benzoate and/or zirconyl diphenylacetate.

Generally, a great advantage of the catalysts employed here is that they are nonhazardous compounds that are easy to handle.

The catalyst is generally employed in amounts of from 0.0005% to 2.0% by weight, preferably from 0.0010% to 1.0% by weight and more preferably from 0.0015% to 0.5% by weight, based on the isocyanate component. The catalyst can be employed in bulk. This has the advantage that the polyisocyanates then obtained do not comprise impurities due to any catalyst solvents employed.

However, the catalysts can also be employed as mixtures of the catalyst with a catalyst solvent, preferably with an organic catalyst solvent. Here, the dilution factor of the catalyst solutions can be chosen freely within very wide limits. Solutions having a concentration of from 0.01% by weight upwards are catalytically active.

Useful catalyst solvents are, for example, isocyanate-inert solvents, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxypropyl 2-acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulphoxide, triethyl phosphate or any desired mixtures of such solvents.

In the process according to the invention, it is preferable to employ catalyst solvents which bear isocyanate-reactive groups and which can be incorporated into the polyisocyanate. Examples of such solvents are mono- or polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethyl-1,3-hexanediol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethyl-1,3-pentanediol monoisobutyrate; unsaturated alcohols, for example allyl alcohol, 1,1-dimethyl allyl alcohol or oleic alcohol; araliphatic alcohols, for example benzyl alcohol; N-monosubstituted amides, for example N-methylformamide, N-methylacetamide, cyanoacetamide or 2-pyrrolidinone or any desired mixtures of such solvents.

In terms of the isocyanate component, it is preferable when the isocyanate component employed is at least one aliphatic, cycloaliphatic or araliphatic isocyanate, preferably at least one aliphatic or araliphatic diisocyanate. The isocyanate component can be produced by any desired process, for example by phosgenation or by a phosgene-free route, for example by urethane scission.

Compounds useful as the isocyanate component include, for example, those in the molecular weight range 140 to 400 g/mol, for example 1,4-diisocyanatobutane, 1,5-diisocyanatopentane, 1,6-diisocyanatohexane (HDI), 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanate-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane, 1,3- and 1,4-bis(isocyanatomethyl)cyclohexane, 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate and any desired mixtures of such diisocyanates.

Further likewise useful diisocyanates are additionally found, for example, in Justus Liebigs Annalen der Chemie, volume 562 (1949), pages 75-136.

It is very particularly preferable when the isocyanate component employed is at least 1,6-diisocyanatohexane, 1,3- or 1,4-bis(isocyanatomethyl)benzene, 1,6-diisocyanatohexane being especially preferred.

In a development of the invention, the isocyanate component is mixed with a hydroxy-functional component and reacted in the presence of the catalyst to give the polyisocyanates.

In a preferred embodiment, the hydroxy-functional component employed comprises up to 0.0049% by weight, based on the isocyanate component, of phenolic hydroxy-functional compounds.

Compounds suitable for use as phenolic hydroxy-functional compounds include, for example, the following: phenol, the isomeric cresols, 2-ethylphenol, 4-ethylphenol, 4-octylphenol, 4-tert-octylphenol, the isomeric nonylphenols, 1-naphthol, 2-naphthol and the isomeric dihydroxy- and/or trihydroxybenzenes.

It is also particularly preferable when the hydroxy-functional component is free of phenolic hydroxy-functional compounds.

In a further preferred embodiment, the hydroxy-functional component employed comprises up to 5.0% by weight, preferably up to 2.5% by weight and more preferably up to 0.49% by weight, based on the isocyanate component, of aliphatic hydroxy-functional compounds.

In a further particularly preferred embodiment, the hydroxy-functional component comprises at least one linear or branched, optionally substituted mono-, di- or trialcohol having 1 to 18 carbon atoms, preferably having 1 to 9 carbon atoms and more preferably having 1 to 6 carbon atoms.

In a further very particularly preferred embodiment, the hydroxy-functional component consists of a linear or branched, optionally substituted mono-, di- or trialcohol having 1 to 18 carbon atoms, preferably having 1 to 9 carbon atoms and more preferably having 1 to 6 carbon atoms.

Compounds suitable for use as aliphatic, hydroxy-functional compounds include, for example, the following: methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, hydroxymethylcyclohexane, 3-methyl-3-hydroxymethyloxetane, 1,2-ethanediol, 1,2- and 1,3-propanediol, the isomeric butanediols, pentanediols, hexanediols, heptanediols and octanediols, 1,10-decanediol, 1,2- and 1,4-cyclohexanediol, 1,4-cyclohexanedimethanol, 4,4'-(1-methylethylidene)biscyclohexanol, 1,2,3-propanetriol, 1,1,1-trimethylolethane, 1,2,6-hexanetriol, 1,1,1-trimethylolpropane, 2,2-bis(hydroxymethyl)-1,3-propanediol, bis(2-hydroxyethyl)hydroquinone, 1,2,4- and 1,3,5-trihydroxycyclohexane or 1,3,5-tris(2-hydroxyethyl)isocyanurate but also simple ester or ether alcohols, for example ethyl 2-hydroxypropionate, n-butyl 2-hydroxypropionate, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, neopentyl glycol hydroxypivalate, diethylene glycol and dipropylene glycol or any desired mixtures of such alcohols. In a preferred embodiment, the isocyanate component for carrying out the process according to the invention can be initially charged, optionally under inert gas, for example nitrogen, and optionally in the presence of a solvent, at a temperature between 0° C. and 120° C., preferably 20° C. to 100° C., more preferably 40° C. to 100° C. Here, solvent is in particular understood to mean a solvent selected from the catalyst solvents previously indicated as being isocyanate-inert.

Once the isocyanate component has been initially charged, the catalyst or a mixture of the catalyst with the catalyst solvent can be added in the amount indicated hereinabove. The catalyst can be added in one or more portions or else continuously, for example with the aid of a suitable dosing pump, over the whole duration of the reaction.

It is also preferable to add the optionally employed hydroxy-functional component to the isocyanate component prior to the adding of the catalyst.

In a further preferred embodiment, the hydroxy-functional catalyst solvent and aliphatic hydroxy-functional compounds employed sum to up to 5.0% by weight, preferably up to 2.5% by weight and more preferably up to 0.49% by weight, based on the isocyanate component.

In a further preferred embodiment, the reaction is carried out at a temperature in the range between 40° C. and 150° C., preferably between 85° C. and 135° C. and more preferably between 105° C. and 125° C.

Irrespective of the type of reaction, when hydroxy-functional components are used the reaction can generally be conducted to beyond the degree of conversion corresponding to complete allophanatization to such an extent that the process products according to the invention have a content of allophanate groups of no more than 70 mol %, preferably of no more than 60 mol %, more preferably of no more than 50 mol %, based on the total amount of allophanate, isocyanurate and iminooxadiazinedione groups.

In the present case, a reaction mixture is understood to mean a mixture comprising the isocyanate component, the catalyst, any further starting materials and the polyisocyanates formed.

In the process according to the invention, the ratio of iminooxadiazinedione, isocyanurate, uretdione and/or allophanate groups can be determined, for example, by NMR spectroscopic analysis of the reaction mixtures or the resultant polyisocyanates. It is preferably possible to use $^{13}C$ NMR spectroscopy here, preferably proton decoupled, since the iminooxadiazinedione, isocyanurate, uretdione and/or allophanate groups give characteristic signals.

The indications (mol %) given in the context of the present application regarding the iminooxadiazinedione, isocyanurate, uretdione and/or allophanate groups formed under the conditions of the process according to the invention were calculated from $^{13}C$ NMR spectra and are each based on the sum of the isocyanurate, iminooxadiazinedione, uretdione and, as the case may be, allophanate groups present.

In a further preferred embodiment, the progress of the reaction in the process according to the invention is monitored via the decrease in content of isocyanate groups in the reaction mixture. The content of isocyanate groups in the reaction mixture and likewise the content of isocyanate groups of the polyisocyanates obtained by the process according to the invention can be determined by titrimetry for example. The content of isocyanate groups is described hereinbelow as NCO content.

In a further preferred embodiment, the reaction is conducted to such an extent that the reaction mixture exhibits a degree of oligomerization of from 10% to 40%, preferably from 15% to 30%. In the present case, the "degree of oligomerization" is the percentage of the isocyanate groups originally present in the starting mixture consumed during the reaction according to the invention. The degree of oligomerization in percent can be calculated using the following formula:

$$\text{degree of oligomerization} = (\text{NCO}_{Start} - \text{NCO}_{End})/\text{NCO}_{Start} \times 100$$

The reaction can be terminated on attainment of the target degree of oligomerization for example. This degree of oligomerization is generally attained after a reaction time of from 30 minutes to 8 hours, preferably from 1 to 6 hours.

The reaction can be terminated by cooling the reaction mixture to room temperature for example. However, the reaction is generally stopped by adding a catalyst poison and then optionally heating the reaction mixture for a short time, for example to a temperature in excess of 80° C.

Useful catalyst poisons are, for example, inorganic acids such as hydrochloric acid, phosphorous acid or phosphoric acid, acid chlorides such as acetyl chloride, benzoyl chloride or isophthaloyl dichloride, sulphonic acids and sulphonic acid esters, for example methanesulphonic acid, p-toluenesulphonic acid, trifluoromethanesulphonic acid, perfluorobutanesulphonic acid, dodecylbenzenesulphonic acid, methyl p-toluenesulphonate and ethyl p-toluenesulphonate, mono and dialkyl phosphates such as monotridecyl phosphate, dibutyl phosphate and dioctyl phosphate but also silylated acids, such as trimethylsilyl methanesulphonate, trimethylsilyl trifluoromethanesulphonate, tris(trimethylsilyl) phosphate and diethyl trimethylsilyl phosphate.

The amount of catalyst poison required to stop the reaction depends on the amount of catalyst employed; generally an equivalent amount of the catalyst poison, based on the catalyst employed at the start, is used. However, when catalyst losses which may occur during the reaction are taken into account, even 20 to 80% (in terms of equivalents) of the catalyst poison, based on the amount of the catalyst originally employed, may be sufficient to stop the reaction.

The catalyst poisons mentioned can be employed either in bulk or dissolved in a suitable solvent. Suitable solvents are, for example, the solvents already described hereinabove as possible catalyst solvents or mixtures thereof. The dilution factor can be chosen freely within very wide limits and solutions having a concentration of 10% by weight or above, for example, are useful.

In addition to the solvents mentioned, the abovementioned isocyanate components can also serve as solvents for the catalyst poisons in the process according to the invention when said poisons are sufficiently isocyanate-inert and therefore allow storage-stable solutions to be produced.

Once the reaction has been stopped, the reaction mixture is preferably freed of volatile constituents (excess monomeric isocyanate components and any solvents used) by thin-film distillation under reduced pressure, for example at a pressure of less than 1.0 mbar, preferably less than 0.5 mbar, more preferably less than 0.2 mbar, under very mild conditions, preferably at a temperature of from 100° C. to 200° C., preferably from 120° C. to 180° C.

In a further embodiment of the process according to the invention, the volatile constituents mentioned are removed from the polyisocyanate by extraction with suitable isocyanate-inert solvents, for example aliphatic or cycloaliphatic hydrocarbons such as pentane, hexane, heptane, cyclopentane or cyclohexane.

In a further preferred embodiment, the catalyst remains in the polyisocyanates since in this way costly and inconvenient removal can be avoided while the properties of the polyisocyanates according to the invention remain unchanged and very good.

Irrespective of the nature of the work-up, the obtained products of process according to the invention are clear, generally practically colourless polyisocyanates having a content of iminooxadiazinedione groups of at least 20 mol %, preferably at least 25 mol %, more preferably at least 30 mol %, in each case based on the total amount of isocyanurate and iminooxadiazinedione groups.

It is also preferable when the polyisocyanates obtained have an NCO content of from 17.0% to 24.5% by weight, preferably 18.0% to 24.0% by weight, more preferably 20.0% to 23.5% by weight.

The invention further provides polyisocyanates obtainable by the process according to the invention.

The polyisocyanates according to the invention are outstandingly useful as curing agents for two-component polyurethane coatings comprising the conventional polyether polyols, polyester polyols, polycarbonate polyols and/or polyacrylate polyols as the hydroxy-functional component co-reactants for the polyisocyanates.

The polyisocyanates according to the invention can be employed in solvent-free form on account of their low viscosity but can if required also be diluted, without clouding, with conventional solvents, for example the previously mentioned isocyanate-inert solvents optionally employed in the process according to the invention. The coating compositions formulated with the polyisocyanates according to the invention, into which compositions the auxiliary and additive agents customary in the coatings sector, for example flow control assistants, colour pigments, fillers or matting agents, can optionally be incorporated, generally possess good coating properties even on room-temperature drying. However, they can of course also be dried under forced conditions at elevated temperature or by stoving at temperatures of up to 260° C.

To control the curing rate, it is possible when formulating the coating compositions to use suitable catalysts, for example the catalysts customary in isocyanate chemistry, for example tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine or metal salts such as iron(III) chloride, zinc chloride, zinc 2-ethylcaproate, zinc(II) octanoate, zinc(II) ethylcaproate, dibutyltin(IV) dilaurate, bismuth(III) 2-ethylhexanoate, bismuth(III) octoate or molybdenum glycolate.

The polyisocyanates according to the invention are also useful as crosslinker components for solutions or suspensions in water of binders or binder components having isocyanate-reactive groups, in particular alcoholic hydroxyl groups, in the production of aqueous two-component polyurethane systems. On account of their low viscosity, they can be used either as such, i.e. in hydrophobic form, or else in a form hydrophilically modified by known processes, for example according to EP-B 0 540 985, EP-B 0 959 087 or EP-B 1 287 052.

In a preferred embodiment, some or all of the isocyanate groups of the polyisocyanates may have been reacted with at least one blocking agent.

These blocking agents are in particular blocking agents known per se from polyurethane chemistry, for example diethyl malonate, ethyl acetoacetate, activated cyclic ketones, for example cyclopentanone 2-carboxymethyl ester and -carboxyethyl ester, acetone oxime, butanone oxime, ε-caprolactam, 3,5-dimethylpyrazole, 1,2,4-triazole, dimethyl-1,2,4-triazole, imidazole, benzyl-tert-butylamine or any desired mixtures of these blocking agents.

The polyisocyanates according to the invention can also be combined with polyamines, for example the polyaspartic acid derivatives known from EP-B 0 403 921 or else polyamines of the type whose amine groups exist in blocked form, for example polyketimines, polyaldimines or oxazolanes. Under the influence of moisture, these blocked amino groups form free amino groups and, in the case of the oxazolanes, also free hydroxyl groups, which react with the isocyanate groups of the polyisocyanates according to the invention by crosslinking.

In blocked form, the polyisocyanates according to the invention can also be used in combination with the above-mentioned coating binders or coating binder components as one-component PU baking systems.

All coating combinations comprise the polyisocyanates and their co-reactants in amounts such that for each optionally blocked isocyanate group there are 0.5 to 3, preferably 0.6 to 2.0, more preferably 0.8 to 1.6, optionally blocked isocyanate-reactive groups. However, the polyisocyanates according to the invention can optionally also be admixed in minor amounts with non-functional coating binders to achieve very specific properties, for example as an additive for promoting adhesion.

The coatings formulated with the aid of the polyisocyanates according to the invention can be used with any substrates, for example, metal, wood, glass, stone, ceramic materials, concrete, hard and flexible plastics, textiles, leather and paper, which can optionally also be provided with conventional primers prior to coating.

In addition to the preferred use as crosslinking components for solvent-free, solvent-containing or aqueous 2K PU coatings, the polyisocyanates according to the invention are outstandingly useful as crosslinkers for solvent-free or solvent-containing adhesive binders or aqueous dispersion adhesives or else as a synthesis component for producing lightfast compact or foamed polyurethane shaped bodies.

The invention therefore further provides polyurethanes obtainable by reacting the polyisocyanates according to the invention with at least one hydroxy-functional component.

The hydroxy-functional component is preferably selected from polyacrylates, i.e., polymers or copolymers of alkyl (meth)acrylates, optionally with styrene or other copolymerizable olefinically unsaturated monomers.

The invention yet further provides polyureas obtainable by reacting the polyisocyanates according to the invention with at least one amino-functional component.

Useful amino-functional components are in particular polyaspartic esters obtainable, for example, by the process of EP-B 0 403 921 by reacting diamines with fumaric acid or maleic esters.

The invention is more particularly described hereinbelow with reference to examples.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

All percentages are by weight unless otherwise indicated.
The NCO contents were determined by titrimetry according to DIN EN ISO 11909.

The residual monomer contents were measured by gas chromatography with internal standard according to DIN EN ISO 10283.

All viscosity measurements were effected with a Physica MCR 51 rheometer from Anton Paar Germany GmbH (DE) according to DIN EN ISO 3219.

The contents (mol %) of the iminooxadiazinedione, isocyanurate, uretdione and/or allophanate groups formed under the conditions of the process according to the invention were calculated from the integrated proton decoupled $^{13}C$ NMR spectra (acquired on a Bruker DPX-400 instrument) and are in each case based on the sum of the isocyanurate, iminooxadiazinedione, uretdione, and as the case may be allophanate, groups present. The individual structural elements have the following chemical shifts (in ppm): iminooxadiazinedione: 147.8, 144.3 and 135.3; isocyanurate: 148.4; uretdione: 157.1; allophanate: 155.7 and 153.8

Example 1 (Inventive)

840 g (5 mol) of hexamethylene diisocyanate (HDI) were initially charged at a temperature of 115° C. under dry nitrogen with stirring and admixed four times with 0.04 g each time of zirconium tetra-n-butylate as catalyst, at intervals of about 40 min in each case. A rapidly decreasing exotherm which caused the reaction mixture to heat up to 118-119° C. for a short time was observable immediately after each catalyst addition. Following addition of the final amount of catalyst, the mixture was stirred at 115° C. for a further two hours until an NCO content of 42.5% had been achieved. The catalyst was then deactivated by adding 0.5 g of a 10% strength solution of isophthaloyl dichloride in HDI and subsequently stirring for 15 minutes. Finally, the unconverted monomeric HDI was separated off in a thin layer evaporator at a temperature of 130° C. and a pressure of 0.1 mbar.

A practically colourless, clear polyisocyanate mixture was obtained, which had the following characteristics and composition:

NCO content: 22.7% monomeric HDI: 0.09% viscosity (23° C.): 1450 mPas iminooxadiazinedione groups: 32.8 mol % isocyanurate groups: 64.2 mol % uretdione groups: 3.0 mol % iminooxadiazinedione/isocyanurate: 33.8:66.2

Example 2 (Inventive)

In accordance with the process described in Example 1, 840 g (5 mol) of HDI were reacted by portionwise addition of a total of 0.2 g of zirconium tetra-2-ethylhexylate. The reaction was terminated as described in Example 1, at an NCO content of 43.8%, with 1.4 g of a 10% strength solution of isophthaloyl dichloride in HDI and the reaction mixture was worked up by distillation. A practically colourless, clear polyisocyanate mixture was obtained, which had the following characteristics and composition:

NCO content: 23.1% monomeric HDI: 0.22% viscosity (23° C.): 840 mPas iminooxadiazinedione groups: 37.5 mol % isocyanurate groups: 60.4 mol %
uretdione groups: 2.1 mol %
iminooxadiazinedione/isocyanurate: 38.3:61.7

Example 3 (Inventive)

In accordance with the process described in Example 1, 840 g (5 mol) of HDI were reacted by portionwise addition of a total of 0.8 g of a 10% strength solution of zirconium tetraethylate in chlorobenzene. The reaction was terminated as described in Example 1, at an NCO content of 41.8%, with 0.6 g of a 10% strength solution of isophthaloyl dichloride in HDI and the reaction mixture was worked up by distillation.

A practically colourless, clear polyisocyanate mixture was obtained, which had the following characteristics and composition:
NCO content: 22.2%
monomeric HDI: 0.15%
viscosity (23° C.): 1950 mPas
iminooxadiazinedione groups: 20.4 mol %
isocyanurate groups: 75.4 mol %
uretdione groups: 4.2 mol %
iminooxadiazinedione/isocyanurate: 21.3:78.7

Example 4 (Inventive)

In accordance with the process described in Example 1, 840 g (5 mol) of HDI were reacted by portionwise addition of a total of 0.24 g of titanium tetra-n-butylate. The reaction was terminated as described in Example 1, at an NCO content of 44.5%, with 0.8 g of a 10% strength solution of isophthaloyl dichloride in HDI and the reaction mixture was worked up by distillation. A yellow, clear polyisocyante mixture was obtained, which had the following characteristics and composition:
NCO content: 23.2%
monomeric HDI: 0.14%
viscosity (23° C.): 1070 mPas
iminooxadiazinedione groups: 20.1 mol %
isocyanurate groups: 76.2 mol %
uretdione groups: 3.7 mol %
iminooxadiazinedione/isocyanurate: 20.9:79.1

Example 5 (Inventive)

In accordance with the process described in Example 1, 840 g (5 mol) of HDI were reacted by portionwise addition of a total of 0.2 g of hafnium tetra-n-butylate. The reaction was terminated as described in Example 1, at an NCO content of 44.9%, with 1.1 g of a 10% strength solution of isophthaloyl dichloride in HDI and the reaction mixture was worked up by distillation.

A colourless, clear polyisocyanate mixture was obtained, which had the following characteristics and composition:
NCO content: 23.5%
monomeric HDI: 0.10%
viscosity (23° C.): 840 mPas
iminooxadiazinedione groups: 37.6 mol %
isocyanurate groups: 59.0 mol %
uretdione groups: 3.4 mol %
iminooxadiazinedione/isocyanurate: 38.9:61.1

Example 6 (Inventive)

In accordance with the process described in Example 1, 840 g (5 mol) of HDI were reacted by portionwise addition of a total of 0.32 g of zirconium tetraoctanoate. The reaction was terminated as described in Example 1, at an NCO content of 43.6%, with 1.5 g of a 10% strength solution of isophthaloyl dichloride in HDI and the reaction mixture was worked up by distillation. A pale-yellow-coloured, clear polyisocyanate mixture was obtained, which had the following characteristics and composition:
NCO content: 22.0%
monomeric HDI: 0.23%
viscosity (23° C.): 1680 mPas
iminooxadiazinedione groups: 21.5 mol %
isocyanurate groups: 73.6 mol %
uretdione groups: 4.9 mol %
iminooxadiazinedione/isocyanurate: 22.6:77.4

Example 7 (Inventive)

In accordance with the process described in Example 1, 840 g (5 mol) of HDI were reacted by portionwise addition of a total of 0.40 g of zirconyl octanoate. The reaction was terminated as described in Example 1, at an NCO content of 43.2%, with 0.9 g of a 10% strength solution of isophthaloyl dichloride in HDI and the reaction mixture was worked up by distillation.

A pale-yellow-coloured, clear polyisocyanate mixture was obtained, which had the following characteristics and composition:
NCO content: 22.6%
monomeric HDI: 0.22%
viscosity (23° C.): 1240 mPas
iminooxadiazinedione groups: 27.0 mol %
isocyanurate groups: 67.5 mol %
uretdione groups: 5.5 mol %
iminooxadiazinedione/isocyanurate: 28.6:71.4

The inventive examples 1-7 show that using a mono- or multinuclear complex of titanium, zirconium and/or hafnium as catalyst leads to very efficient reaction of the isocyanate component to give polyisocyanates having a content of iminooxadiazinedione groups of from at least 20 to more than 38 mol % based on the total amount of isocyanurate and iminooxadiazinedione groups.

Example 8 (Inventive—Reaction with an Alcohol Group Containing Co-Reactant)

840 g (5 mol) of hexamethylene diisocyanate (HDI) were initially charged at a temperature of 115° C. under dry nitrogen with stirring and admixed consecutively with 18.5 g (0.25 mol) of n-butanol and with 0.2 g of zirconium tetra-2-ethylhexylate as catalyst. Based on the exotherm of the reaction the mixture heated up to 118° C. After the decrease of the exotherm (about 30 min) the NCO-content of the reaction mixture was 46.5%, what correlates to a calculative value of a complete allophanatization reaction.

At this point the mixture was sampled and determined by a $^{13}$C-NMR-spectroscopic analysis. Merely the signals for allophanate groups (about 98 mol-%) and for isocyanurat groups (about 2 mol-%) were found in the spectrum, but no signals for urethane groups or asymmetric trimers.

The mixture was stirred at 115° C. for a further four hours until an NCO content of 40.4% had been achieved. The catalyst was then deactivated by adding 1.4 g of a 10% strength solution of isophthaloyl dichloride in HDI and subsequently stirring for 15 minutes. Finally, the unconverted monomeric HDI was separated off in a thin layer evaporator at a temperature of 130° C. and a pressure of 0.1 mbar.

A practically colourless, clear polyisocyanate mixture was obtained, which had the following characteristics and composition:
NCO content: 21.1%
monomeric HDI: 0.19%
viscosity (23° C.): 1240 mPas
iminooxadiazinedione groups: 12.1 mol %
isocyanurate groups: 44.8 mol %
uretdione groups: 2.7 mol %
allophanate groups. 40.4%
iminooxadiazinedione/isocyanurate: 21.3:78.7

The example shows that the formation of oligomers during the allophanatisation reaction is merely a side-reaction. Only after the complete reaction of the hydroxyl groups with the intermediately formed urethane groups the oligomerisation reaction, which by then is merely a side-reaction, becomes the main-reaction and more and more isocyanurate and iminooxadiazinedione groups are formed.

The invention claimed is:

1. A process for producing a polyisocyanate containing isocyanurate and iminooxadiazinedone groups comprising reacting an isocyanate component in the presence of a catalyst to give polyisocyanates having a content of iminooxadiazinedione groups of $\geq 20$ mol % based on the total amount of isocyanurate and iminooxadiazinedione groups, wherein the reaction is carried out at a temperature in the range between 105° C. and 150° C., wherein the catalyst is at least one carboxylate of general formulae (II) or (III)

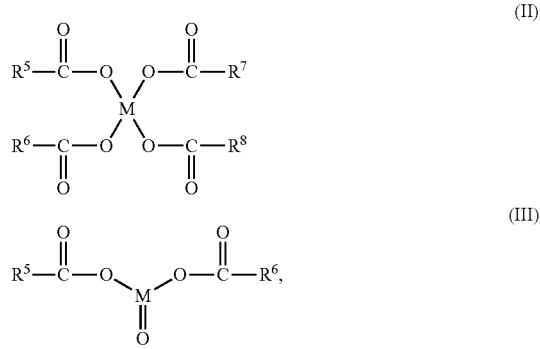

where
M is titanium, zirconium or hafnium,
$R^5$, $R^6$, $R^7$ and $R^8$ are identical or different radicals and are each a saturated or unsaturated, linear or branched aliphatic or cycloaliphatic, optionally substituted aromatic or araliphatic radical which can comprise 1 to 18 carbon atoms and optionally up to 3 heteroatoms selected from oxygen, sulphur, nitrogen, and optionally up to 3 oxygen atoms and where $R^5$, $R^6$, $R^7$ and $R^8$ in formula (II) and $R^5$ and $R^6$ in formula (III) can also form, in any combination with one another together with M and at least two oxygen atoms and optionally further nitrogen or oxygen atoms, heterocyclic rings having 3 to 6 carbon atoms, and can preferably form, together with M and two oxygen atoms, heterocyclic rings having 2 or 3 carbon atoms.

2. The process according to claim 1, wherein the catalyst is employed in an amount of from 0.0005% to 2.0% by weight, based on the isocyanate component.

3. The process according to claim 1, wherein the isocyanate component is at least one aliphatic, cycloaliphatic or araliphatic isocyanate, preferably at least one aliphatic and/or araliphatic diisocyanate and more preferably at least 1,6-diisocyanatohexane, 1,3- or 1,4-bis(isocyanatomethyl) benzene.

4. The process according to claim 1, wherein the isocyanate component is at least 1,6-diisocyanatohexane, 1,3- or 1,4-bis(isocyanatomethyl)benzene.

5. The process according to claim 1, wherein the isocyanate component is mixed with a hydroxy-functional component and reacted in the presence of the catalyst to give the polyisocyanate.

6. The process according to claim 5, wherein the hydroxy-functional component comprises up to 0.0049% by weight, based on the isocyanate component, of phenolic hydroxy-functional compounds.

7. The process according to claim 5, wherein the hydroxy-functional component is free of phenolic hydroxy-functional compounds.

8. The process according to claim 5, wherein the aliphatic hydroxy-functional compound comprises at least one linear or branched, optionally substituted mono-, di- or trialcohol having 1 to 18 carbon atoms.

9. The process according to claim 1, wherein the catalyst remains in the polyisocyanate.

10. A polyisocyanate obtained by a process according to claim 1, wherein the catalyst remains in the polyisocyanate.

11. The polyisocyanate according to claim 1, wherein some or all of the isocyanate groups of the polyisocyanate have been reacted with at least one blocking agent.

12. A polyurethane obtained by reacting the polyisocyanate according to claim 10 with at least one hydroxy-functional component.

13. A polyurea obtained by reacting the polyisocyanate according claim 10 with at least one amino-functional component.

14. The process according to claim 1, wherein the at least one carboxylate of formula (II) is selected from the group consisting of titanium tetra-2-ethylhexanoate, titanium tetrastearate, titanium tetraacrylate, titanium tetrabenzoate, zirconium tetraacetate, zirconium tetrapropionate, zirconium tetrabutanoate, zirconium tetraoctanoate, zirconium tetra-2-ethylhexanoate, zirconium tetraneodecanoate, zirconium tetrastearate, zirconium oxalate, zirconium glycolate, zirconium lactate, zirconium tetraacrylate, zirconium tetramethacrylate, zirconium tetranaphthenate, hafnium tetraacetate, hafnium oxalate, hafnium tetraoctoate, hafnium tetra-2-ethylhexanoate, and hafnium tetraneodecanoate.

15. The process according to claim 1, wherein the at least one carboxylate of formula (III) is selected from the group consisting of titanyl acetate, titanyl propionate, titanyl butanoate, titanyl pentanoate, titanyl hexanoate, titanyl 2-ethylhexanoate, titanyl octanoate, zirconyl acetate, zirconyl octanoate, zirconyl decanoate, zirconyl dodecanoate, zirconyl tetradecanoate, zirconyl pentadecanoate, zirconyl stearate, zirconyl dimethacrylate, zirconyl cyclopentanecarboxylate, zirconyl cyclohexanecarboxylate, zirconyl linolate, zirconyl linolenate, zirconyl oleate, zirconyl benzoate and/or zirconyl diphenylacetate.

* * * * *